United States Patent [19]

Rabenhorst

[11] 4,244,240
[45] Jan. 13, 1981

[54] ELASTIC INTERNAL FLYWHEEL GIMBAL

[75] Inventor: David W. Rabenhorst, Clarksville, Md.

[73] Assignee: The Johns Hopkins University, Baltimore, Md.

[21] Appl. No.: 751,371

[22] Filed: Dec. 17, 1976

[51] Int. Cl.³ .................... G05G 1/00; F16F 15/10
[52] U.S. Cl. ................................. 74/572; 74/574; 64/11 R; 416/134 R
[58] Field of Search .............. 74/572, 574; 416/102, 416/134 R, 500, 131, 106, 134; 64/11 R, 11 B, 11 P, 11 F, 27 NM; 248/358 R

[56] References Cited

U.S. PATENT DOCUMENTS

| | | | |
|---|---|---|---|
| 1,157,921 | 10/1915 | Banks | 64/11 R |
| 1,701,518 | 2/1929 | Walker | 74/574 |
| 1,778,197 | 10/1930 | Lord | 74/574 X |
| 1,854,436 | 4/1932 | Witry et al. | 64/11 R |
| 1,928,763 | 10/1933 | Rosenberg | 64/27 NM |
| 1,962,746 | 6/1934 | Lee | 74/574 |
| 2,164,744 | 7/1939 | Huth | 64/11 R X |
| 2,207,496 | 7/1940 | Anderson, Jr. | 64/11 R |
| 2,312,822 | 3/1943 | Julien et al. | 416/134 |
| 2,366,624 | 1/1945 | Kelsey | 64/11 R |
| 2,562,195 | 7/1951 | Lee | 248/358 R |
| 2,585,382 | 2/1952 | Guernsey | 74/574 |
| 2,668,033 | 2/1954 | Lee | 248/358 R |
| 2,702,087 | 2/1955 | Beier | 416/134 |
| 2,766,626 | 10/1956 | Ritter | 74/574 X |
| 2,841,354 | 7/1958 | Humble | 248/358 R |
| 2,969,656 | 1/1961 | Reuter | 64/11 R |
| 3,079,132 | 2/1963 | Tiegel | 248/358 R X |
| 3,140,081 | 7/1964 | Peterson | 64/11 R X |
| 3,245,229 | 4/1966 | Fadler | 64/11 R X |
| 3,430,902 | 3/1969 | Lohr | 248/18 |
| 3,670,593 | 6/1972 | Troyer | 416/134 |

FOREIGN PATENT DOCUMENTS

| | | | |
|---|---|---|---|
| 544390 | 7/1957 | Canada | 248/358 R |
| 687721 | 1/1940 | Fed. Rep. of Germany | 248/358 R |
| 826046 | 12/1959 | United Kingdom | 248/358 R |

OTHER PUBLICATIONS

Bulletin No. 104, Lord Mfg. Co., entitled "Vibration Control", (1941).
MB Mfg. Co. Bulletin, (1951).
Article from Product Engineering Magazine entitled "Vibration Control", (1942).

*Primary Examiner*—Samuel Scott
*Assistant Examiner*—Randall L. Green
*Attorney, Agent, or Firm*—Robert E. Archibald; Samuel L. Sachs

[57] ABSTRACT

An elastic joint mounting and rotatably coupling a rotary inertial energy storage device or flywheel, to a shaft, the present gimbal structure reduces vibration and shock while allowing precession of the flywheel without the need for external gimbal mounts. The present elastic joint usually takes the form of an annular elastic member either integrally formed into the flywheel as a centermost segment thereof or attached to the flywheel or flywheel hub member at the center thereof, the rotary shaft then being mounted centrally to the elastic member.

13 Claims, 7 Drawing Figures

ELASTIC INTERNAL FLYWHEEL GIMBAL

STATEMENT OF GOVERNMENT INTEREST

The invention herein described was made in the course of or under a contract or subcontract with the Department of the Navy.

BACKGROUND AND SUMMARY OF THE INVENTION

The invention relates to apparatus for mounting rotary devices, such as flywheels and the like, which are susceptible to critical vibratory effects caused by high speed operation. In particular, the present mounting structure reduces vibration caused by both internal and external factors, reduces the critical speed of the rotary device, reduces shock, attenuates torsional vibration, and substantially reduces gyroscopic bearing loads and reaction forces. The present structure allows a flywheel to precess slowly in the event of accidental angular displacement of the axis of rotation of the flywheel, thereby preventing damage to the flywheel or its associated bearing from excessive gyroscopic loading. Further, the present structure allows a flywheel to expand during rotation without excessive stress or strain at the interface between the flywheel and the shaft/hub assembly.

Rotary devices such as flywheels, gyroscopes, and the like have been known to man for centuries. Flywheels in particular have come to be used as a means for storing energy, the energy storage ability of a flywheel being generally increased as the square of the rotational speed. Flywheels capable of storing useful amounts of energy must therefore be capable of rotation at extremely high speeds. At such speeds, natural frequencies induce internal vibrations detrimental to the structural integrity of the flywheel. Further, externally-induced vibratory effects and shocks are magnified in effect by virtue of the high rotational speeds of these inertial devices. In addition to the foregoing problems, the use of high energy flywheels in vehicular applications usually require bulky gimbal structures which act to relieve gyroscopic loading should accidental angular displacement of the flywheel occur. The prior art has not found solutions to these and associated problems. Andrews in U.S. Pat. No. 3,537,332, provides a flywheel mounted on and rotatably coupled to a capstan in a manner such that the flywheel is free to seek a plane of rotation perpendicular to its dynamic axis. Andrews places compliant means such as rubber washers between the flywheel and at least one hub plate to provide a frictional coupling therebetween. Since the hub plate is attached to the capstan, the elastically mounted flywheel is caused to rotate on rotation of the capstan. The disclosure, teachings, and intended use of the Andrews structure requires that said structure be configured as described and shown in the aforesaid patent, i.e., the capstan extends through the flywheel to engage and attach to a hub plate which supports the flywheel against gravity. The structure thus provided cannot function to allow precession of a flywheel relative to a shaft such as would be necessitated by gross angular displacement of the axis of rotation of an inertial energy storage device. For example, accidental "rollover" of a moving vehicle employing a high speed flywheel as a prime energy storage source would produce gyroscopic loading forces which would cause damage to the flywheel and/or bearings unless fitted with external gimbal mountings or with the present invention. By virtue of the structure of the hub plate and washer arrangement of Andrews, the flywheel cannot precess more than a fraction of a degree about the capstan.

The present invention in the several embodiments thereof takes the general form of an elastic joint having a shaft mounted centrally thereto, the joint being further mounted centrally on a planar surface of a solid disc flywheel or either within or surmounting a central aperture in a rim flywheel. The present elastic joint is thus not limited to use with flywheel structures having a shaft extending through said structure. As will be described hereinafter, the present apparatus is equally useful for solid disc-type flywheels wherein the elastic joint of the invention is attached to either the upper or lower planar face of the flywheel or both. The elastic joint can be integrally formed into a rim-type flywheel as a centermost segment thereof, the shaft being mounted centrally through the joint. Alternatively, the elastic joint can be attached to a flywheel of any type at the center thereof either directly to the rotor portion thereof or to the central portion of a hub member holding the rotor.

In operation, the present elastic joint acts to reduce the critical speed of the flywheel to a level well below the operating speed range of the flywheel. Of equal significance is the ability of the present joint to attenuate flywheel-induced vibration such that the operating RPM range is above the natural frequency of the apparatus. Additionally, both externally-induced vibration, such as would be caused in a moving vehicle in which a flywheel was mounted, and torsional vibration, such as occurring with an associated electric or hydraulic motor, are attenuated through use of the elastic joint. Shock effects to the flywheel from external inputs are also reduced through use of the invention.

Accordingly, it is an object of the invention to provide an elastic hub mounting between a flywheel and a rotary shaft, which hub mounting couples the flywheel to the shaft for rotary movement and allows precession of the flywheel without the use of external gimbal mountings.

It is a further object of the invention to provide an elastic member coupling a flywheel to a shaft for rotary movement, the elastic member either joining a hub member carrying the flywheel rotor to the shaft or directly coupling the flywheel rotor to the shaft.

It is another object of the invention to provide an elastic gimbal mounting structure which allows precession of a flywheel relative to a stationary shaft while reducing vibratory and shock effects on the flywheel.

Further objects and advantages of the invention will become more readily apparent in light of the following detailed description of the preferred embodiments thereof.

DESCRIPTION OF THE PREFERRED EMBODIMENTS

The embodiments of the invention provide inertial energy storage devices having intrinsic gimballing capability. The present structure essentially comprises an elastic "spherical joint" incorporated into the rotor portion of the energy storage device about its axis of rotation. Through selective choice of elastomeric materials used for the present structure, any desired degree of axial pitching stiffness can be provided. The invention can further be used with rotor structures of varying configurations, such as the filament flywheels disclosed inter alia in U.S. Pat. Nos. 3,672,241; 3,788,162; and 3,964,341. The invention can also be used with more conventional isotropic steel flywheels. In accordance with the scope of the invention as indicated by the teachings provided herein, the invention can conveniently be used with flywheel rotor structures both of the solid (i.e., no central hole) type and of the type having a central hole. Flywheels of the rim type can also be provided with the invention as an elastic connection to the rotary shaft.

Figure 1:
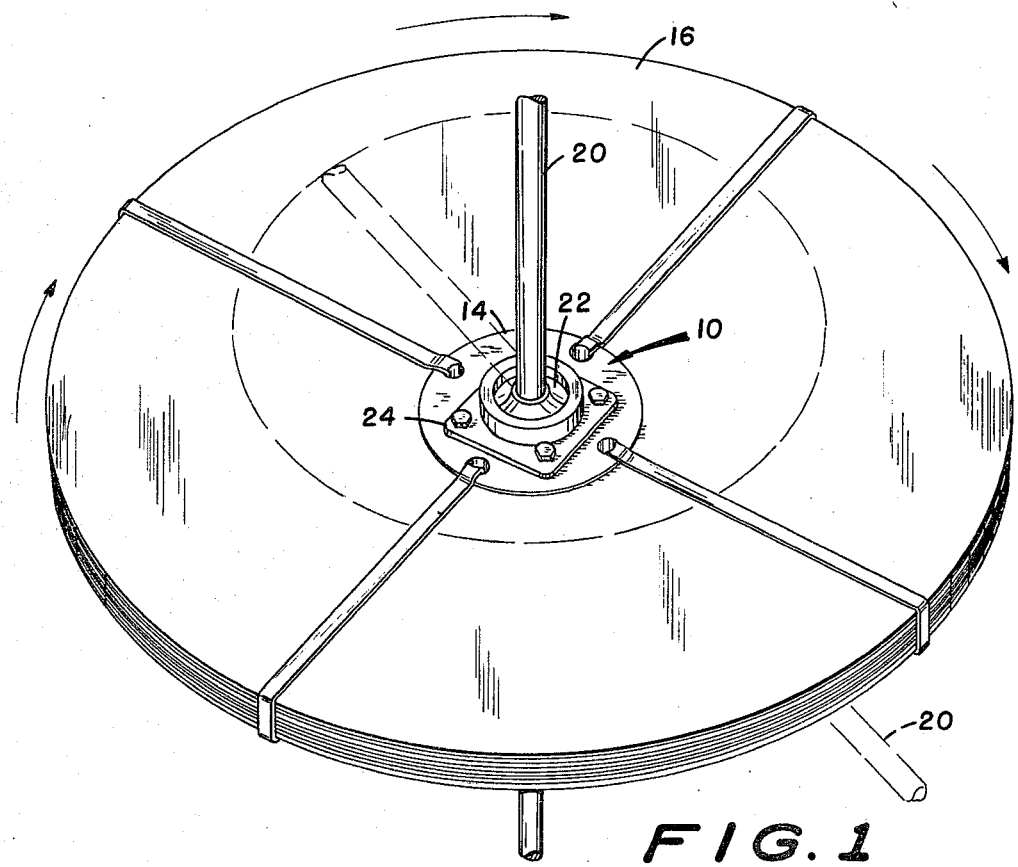
FIG. 1 is a perspective of one embodiment of the present elastic joint mounted to a flywheel rotor.
Figure 2:
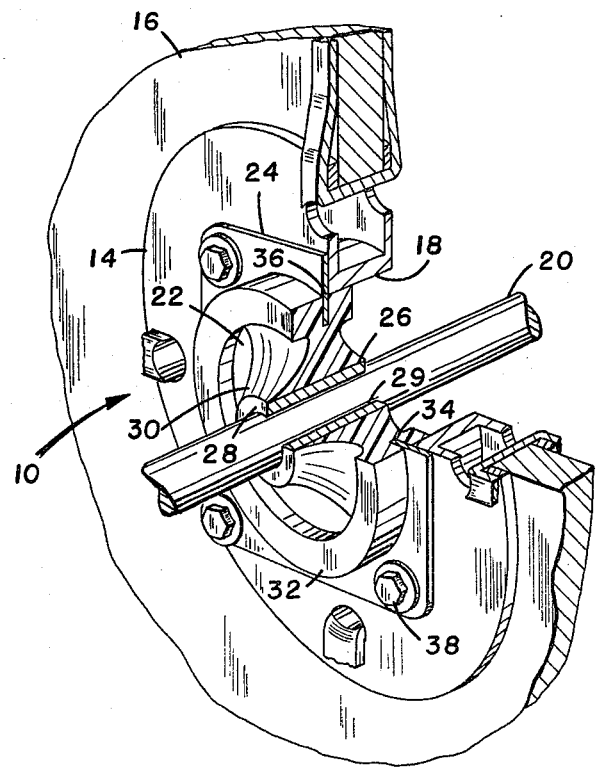
FIG. 2 is a detail perspective partially cut away of the joint of FIG. 1.

Referring now to FIGS. 1 and 2, a first embodiment of the invention is seen to comprise an elastic central joint 10 attached to a hub 14 which carries a flywheel rotor 16. The rotor 16 shown best in FIG. 1 is coincidentally of the type described in U.S. Pat. No. 3,964,341, the rotor 16 comprising anisotropic elements wound about the hub 14. In the rotor assembly of FIGS. 1 and 2, a central hole 18 is formed in the hub 14 (as best seen in FIG. 2), a shaft 20 on which the rotor assembly is caused to rotate extending through the hole 18. The hub 14 could alternatively be solid, in which event the shaft 20 would not extend through the hub and the elastic joint 10 would be attached to the hub in a manner such as is described hereinafter relative to FIG. 3.

Referring primarily to FIG. 2, the elastic joint 10 is seen to comprise a disc member 22 formed of an elastomeric material and a mounting plate 24. The elastomeric disc member 22 has a central aperture 26 formed therein for receiving a shaft mounting collar 28, the collar 28 being permanently bonded to the member 22. The collar 28 has a central aperture 29 formed axially therein for receiving the shaft 20. It is to be understood that the elastomeric body portion of the disc member 22 could alternatively be bonded directly to a portion of the shaft 20, the collar 28 serving as a convenience in mounting of the member 22 to the shaft 20. The disc member 22 is further seen to have a thickened central portion 30 which tapers in a sloping curve from a maximum thickness about the collar 28 to a minimum thickness near the periphery of the said member. At the locus of points, which is a circle, at which the member 22 is of minimum thickness, an annular flange-like lip 32 rises from the nominal surface of both faces of the member. The disc member 22 can be symmetrical about an image plane taken centrally through the lip 32 perpendicular to the shaft 20 when the rotor assembly is at rest. As shown in FIG. 2, however, the slope of the thickened central portion of the disc member 22 is greater on one face thereof than on the opposite face thereof. The mounting plate 24 can be formed of metal or other structurally rigid high-strength material, the plate 24 having a central aperture 34 formed therein. The perimetric edges 36 bordering the aperture 34 are embedded into the disc member 22 around the outer perimetric surface portions of the lip 32. The plate 24 is preferably mounted centrally in the disc member 24 equidistant from upper and lower annular surfaces of the lip 32, the edges 36 of the plate 24 extending a distance into the disc member 22 roughly equal to the width of the lip 32.

The mounting plate 24, which preferably is square or circular, is mounted to the hub 14 by convenient means such as bolts 38. Alternatively, the plate 24 could be adhesively bonded to the surface of the hub 14. As shown in FIG. 2, a portion of the elastic disc member 22 is received within the hole 18 formed in the hub 14. While such an arrangement is usually convenient, the elastic joint 10 could be mounted above the surface of the hub 14, such as by placing spacers between said surface and the plate 24, when the disc member 22 is too large to be accommodated within the hole 18 or when the hub 14 is not provided with a central aperture.

The disc member 22 of the elastic joint 10 can be formed of an elastomeric material such as vulcanized natural rubber or a variety of synthetic "elastomers" which are well-known. Through judicious choice of the material from which the joint 10 is formed, an essentially "spherical joint" is provided which is capable of suitably mounting the rotor 16 to the shaft 20 while compensating for torque loading generated on rotation of the total structure and providing any desired degree of axial pitching stiffness. As seen in phantom in FIG. 1, the joint 10 allows the rotor 16 to undergo precession relative to the shaft 20 so that the rotating structure can accommodate applied or internally-induced stress such as are caused by positional changes without damage to the structure.

Figure 3:
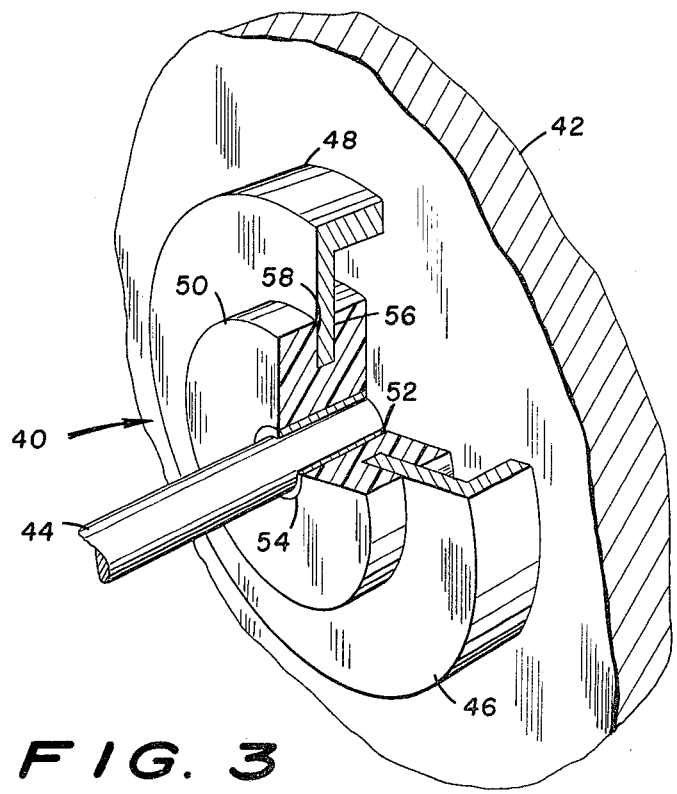
FIG. 3 is a detail perspective partially cut away of a second embodiment of the invention.

A second embodiment of the invention is seen at 40 in FIG. 3 to be attached to a hub 42 which does not have a central aperture formed therein. The elastic joint 40 could also be attached directly to the surface of a flywheel rotor, which has no central hole formed therein, such as a solid steel flywheel or a filament flywheel such as is disclosed in U.S. Pat. No. 3,788,162. Alternatively, the joint 40 could be attached to a hub plate which is in turn attached to the surface of a flywheel rotor. In such situations, a shaft 44 mounted to the rotor assembly through the elastic joint 40 does not extend through the rotor or through the hub 42. The elastic joint 40 can be similar to the embodiment described relative to FIGS. 1 and 2 except that mounting plate 46 has a 90° spacing flange 48 formed about the outer periphery thereof for spacing the joint 40 from the surface of the hub 42, the flange 48 being secured to the hub 42 by adhesive means or the like disposed between contacting surface portions of the flange 48 and the hub 42. In the elastic joint 40, elastomeric disc member 50 is thus held above and spaced from the surface of the hub 42. While the disc member 50 can be formed identically to the disc member 22 of FIGS. 1 and 2, said disc member 50 can take a variety of shapes (as can the other disc members described herein). The member 50 is essentially cylindrical in conformation with a central aperture 52 formed therein to receive a mounting collar 54 which has the same function as the collar 28 of FIG. 2, i.e., to receive a rotary shaft therethrough to mount the flywheel rotor assembly for rotary movement thereon. The disc member 50 receives perimetric edges 56 of the mounting plate 46 within an annular groove 58 formed in the outer wall surface of said member 50. The disc member 50 can assume cylindrical shapes of varying dimensions, the mounting plate 46 generally being mounted to the disc member within the plane of symmetry normal to the longitudinal axis of the central aperture 52 when the flywheel rotor assembly is at rest.

Figure 4:
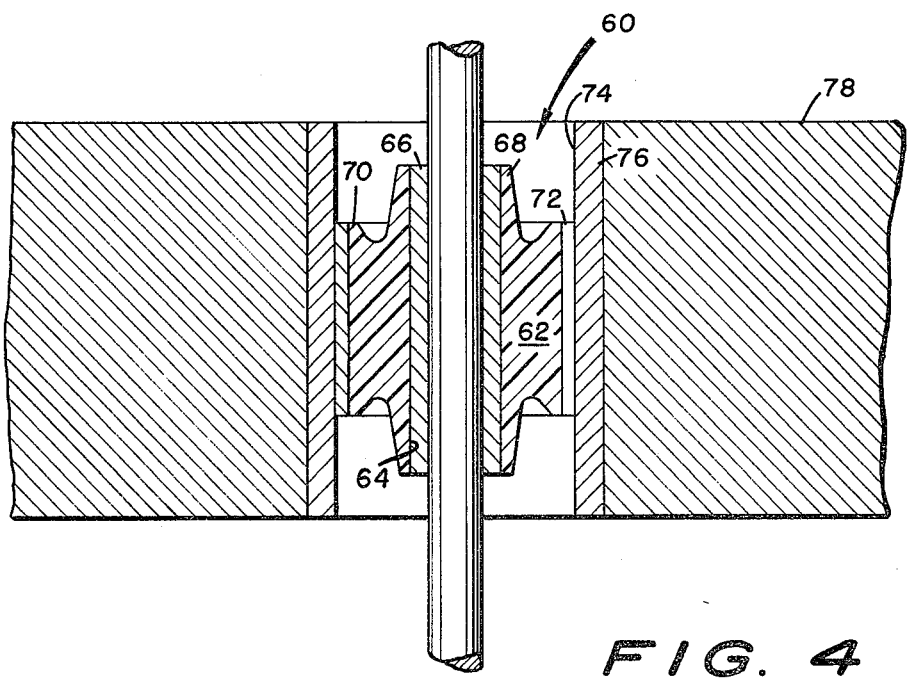
FIG. 4 is an elevational view in section of another embodiment of the invention.

Another embodiment of the invention is shown at 60 in FIG. 4, the elastic joint 60 comprising a central elastic member 62 which is similar to the elastomeric disc member 22 of FIGS. 1 and 2. In the manner of the disc member 22, the elastic member 62 has a central aperture 64 formed axially therein and receives a shaft mounting collar 66 therein. The elastic member 62 has a thickened central portion 68 which tapers in a sloping curve from a maximum thickness about the collar 66 to a minimum thickness near the periphery of the member. At the circular locus of points at which the axial thickness of the member 62 is a minimum, an annular flanged lip 70 rises from the upper and lower faces of the member 62. The lip 62 is attached to an annular peripheral collar 72, which collar 72 can be formed of metal or other structurally rigid material. The collar 72 is then mounted within an aperture 74 formed in a hub collar 76. The hub collar 76 mounts a flywheel rotor 78, the rotor 78 being of any construction wherein a central aperture is suited to the function of the rotor, the rotor 78 being wound of anisotropic filamentary material or formed of isotropic steel or the like. The elastic member 62 can be seen to be elongated relative to the member 22 of FIGS. 1 and 2 at the thickened central portion 68. It is to be understood that the elastic members of the invention, such as the elastic members 22 and 62, can be formed with widely varying dimensions and with elastomeric materials of varying composition.

Figure 5:
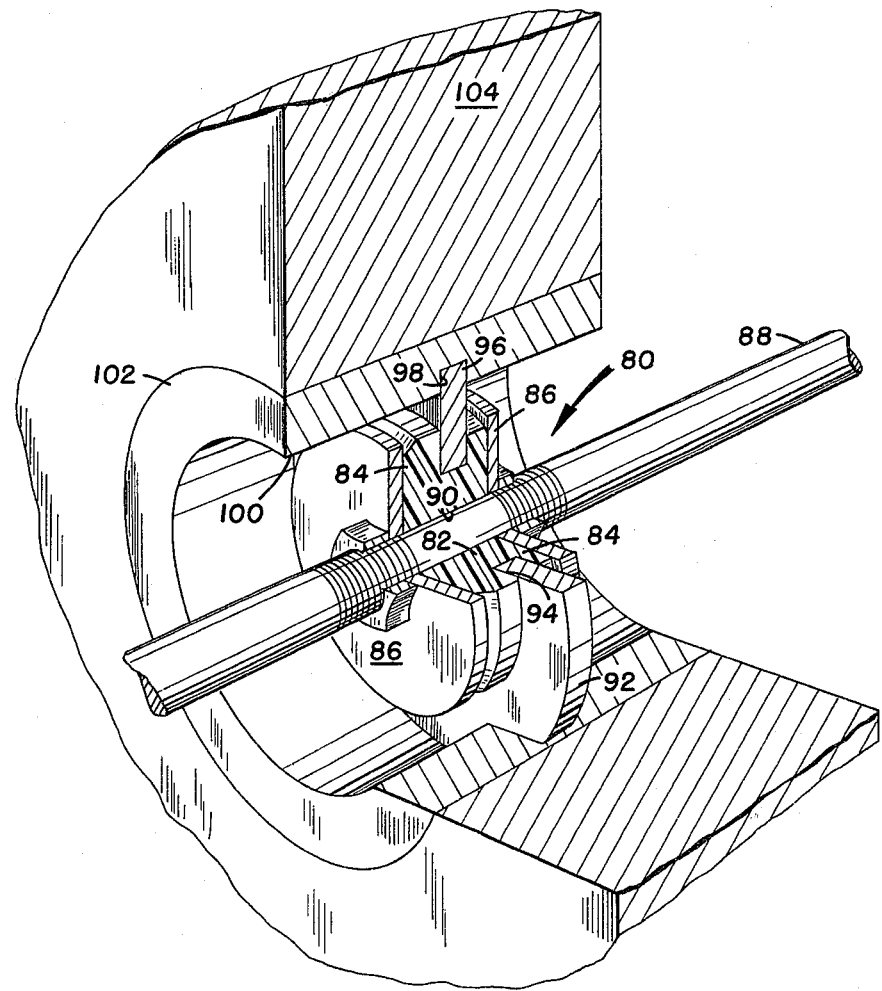
FIG. 5 is a detail perspective partially cutaway of a further embodiment of the invention.

A further embodiment of the invention is seen in FIG. 5 to comprise an elastic joint 80 formed of an essentially cylindrical elastic member 82 having flanged washers 84 formed at upper and lower portions of the member 82. The washers 84 may vary in thickness as shown and can be held in constraint by washer plates 86 which are fixedly mounted to a shaft 88, the shaft 88 extending through a central aperture 90 in the member 82. A mounting plate 92 is received and mounted within an annular groove 94 formed by the washers 84, the outer peripheral edges 96 of the plate 92 being mounted into an annular groove 98 in inner walls 100 of an annular hub collar 102, the hub collar 102 mounting a flywheel rotor 104 about its outer periphery. The washers 84 can be formed on other embodiments of the invention shown herein, the washers 84 and constraining washer plates 86 acting to securely mount the elastic member 82 to the shaft 88.

Figure 6:
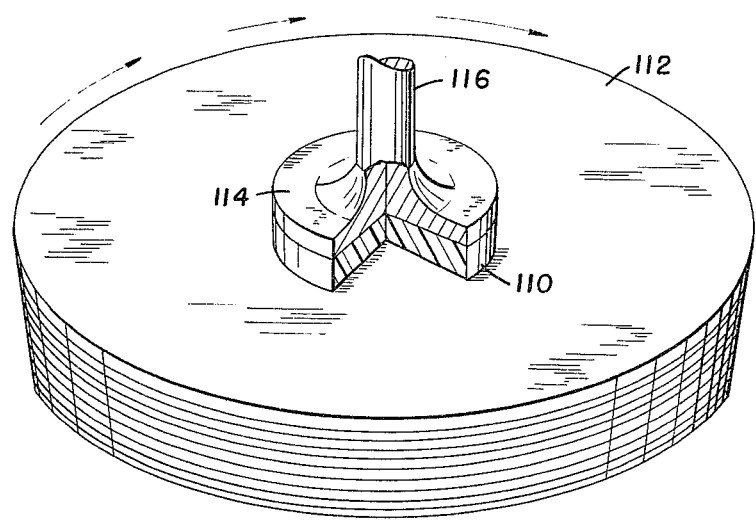
FIG. 6 is a perspective of still another embodiment of the invention.

A further embodiment of the invention is seen in FIG. 6 to comprise a cylindrical elastic member 110 mounted directly to the central upper surface portion of a flywheel rotor 112, which rotor 112 has no central aperture formed therein. The member 110 can either be mounted directly to the rotor 112 as shown or could be mounted to the upper surface of a flat hub plate which is bonded on its lower surface to the rotor. The member 110 is bonded on its upper face to a hub plate 114. The hub plate 114 can either be formed integrally with a shaft 116 or can be suitably attached thereto. The member 110 is preferably formed of an elastomeric material which has a high elastic coefficient, i.e., which is capable of substantial elastic deformation. The member 110 is also usually formed with a substantial axial thickness so that the shaft 116 is allowed to be displaced relative to the rotor 112 in a precessional fashion.

Figure 7:
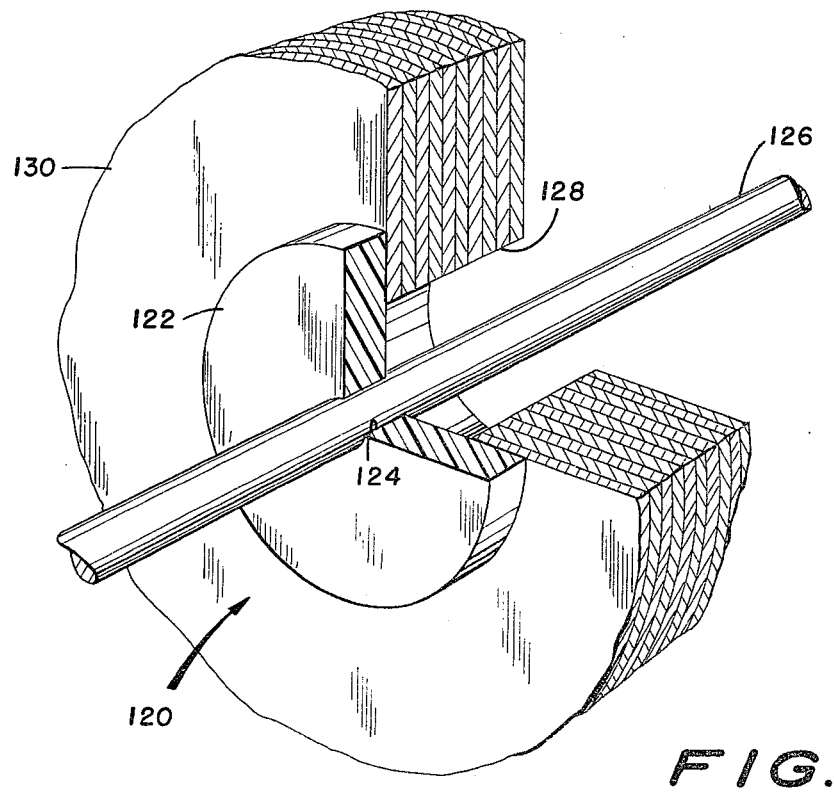
FIG. 7 is a perspective of another embodiment of the invention.

FIG. 7 illustrates an elastic joint 120 similar to the joint of FIG. 6, the joint 120 comprising a cylindrical elastic disc member 122 having a central aperture 124 formed therein. A shaft 126 is mounted within the aperture 124 and extends through a central aperture 128 formed in a flywheel rotor 130. Major lower peripheral surface portions of the member 122 are bonded to the rotor 130 about the central aperture 128. It is to be noted that the disc member 122 fits flushly about and is mounted to the shaft 126, the mounting potentially being made by means of a mounting collar as made obvious by teachings provided hereinabove. However, the central aperture 128 formed in the rotor 130 has a diameter substantially greater than the diameter of the shaft 126, the diameter of the aperture 128 being sufficiently larger than the diameter of the shaft 128 to allow at least several degrees of axial "tilt" of the shaft 126 away from the longitudinal axis of the aperture 128. Precession of the rotor 130 relative to the shaft 126 can thus occur as described hereinabove. For example, a diameter of the aperture 128 which is 50% greater than the shaft diameter proves suitable.

It is to be understood that the present invention provides, in combination with a rotary shaft and a flywheel rotor, an elastic joint which allows inter alia precession of the rotor relative to the shaft, the precession involving a "tilt" of the usual 90° relation between the longitudinal axis of the shaft and the nominal plane in which the rotor lies at rest and during usual spin conditions. The elastic joint in all possible embodiments thereof comprehended by the invention comprises a deformable elastic member disposed between the shaft and the rotor to allow controlled relative movement therebetween. This elastic member can assume a variety of shapes including cylindrical discs and discs having thickened central portions and enlarged outer peripheral portions. These elastic members can further be formed with or without central apertures for receiving a rotary shaft. In essence, the invention is not limited to a particular disc or shaped disc conformation but essentially encompasses the novel concept of mounting a flywheel rotor to a shaft through an elastically deformable joint to allow precession of the rotor relative to the shaft. Accordingly, the invention is to be limited only by the scope of the appended claims.

What is claimed is:

1. An inertial energy storage system wherein energy is put into the system and taken out of the system comprising in combination:

an inertial energy storage flywheel rotor;
a rotary shaft; and
elastic joint means for mounting said flywheel rotor to said rotor shaft substantially central to said flywheel rotor, said elastic joint means permitting precessional movement of said flywheel rotor relative to said shaft, said precessional movement being relative angular displacement between the longitudinal axis of said shaft and the plane occupied by said flywheel rotor.

2. The apparatus of claim 1 wherein said flywheel rotor is formed with a central aperture extending axially therethrough and said disc member is also formed with a central aperture extending axially therethrough for receiving and mounting said shaft, said shaft also extending through said aperture in said flywheel rotor, the diameter of said aperture in said flywheel rotor being greater than the diameter of said shaft to allow precession of said flywheel rotor relative to said shaft.

3. The apparatus of claim 1 wherein said elastic joint means comprises a disc member formed of elastically deformable material.

4. The apparatus of claim 3 wherein said disc member has a central aperture extending axially therethrough for receiving and mounting said shaft therein, said disc member having a thickened portion about said central aperture which slopes toward the periphery of said disc member.

5. The apparatus of claim 4 wherein said disc member is formed with a thickened portion about the outer periphery thereof.

6. The apparatus of claim 5 further comprising mounting plate means connected to said disc member about the outer periphery thereof said mounting plate means being connected to said flywheel rotor.

7. The apparatus of claim 4 further comprising an annular mounting collar received within said central aperture formed in said disc member and fixed therein, said collar having a central aperture axially formed therein for receiving and mounting said shaft.

8. The apparatus of claim 3 wherein said disc member has a central aperture extending axially therethrough for receiving and mounting said shaft therein, the apparatus further comprising a mounting plate connected to said disc member about the outer periphery thereof, said mounting plate being connected to said flywheel rotor.

9. The apparatus of claim 8 wherein said mounting plate has a central aperture formed therein for receiving at least portions of said disc member therein, said disc member having a peripheral groove formed in the outer perimetric wall surfaces thereof, perimetric edge portions of said plate defining said central aperture therein being received and mounted within said peripheral groove in said disc member.

10. The apparatus of claim 8 wherein said mounting plate has flange means about its outer periphery which extends toward said flywheel rotor and mounts said flywheel rotor in spaced relation thereto.

11. The apparatus of claim 3 wherein said flywheel rotor is formed with a central aperture extending axially therethrough, said disc member being disposed within said central aperture of said flywheel rotor, said disc member also having a central aperture formed axially therein for receiving and mounting said shaft, outer perimetric surfaces of said disc member being mounted to inner wall surfaces of said central aperture formed in said flywheel rotor.

12. The apparatus of claim 3 wherein said disc member is formed with flanged washers about the upper and lower surfaces thereof, said disc member being formed with a central aperture for receiving and mounting the shaft, the apparatus further comprising plate means surmounting said washers and fixed to said shaft and a hub mounting plate mounted between said washers and being connected to said rotor.

13. The apparatus of claim 3 wherein said disc member is mounted to a central portion of said flywheel rotor, the apparatus further comprising plate means attached to said disc member over one face of said plate means, said plate means being attached on its other face to said shaft.

* * * * *